US011989696B2

(12) United States Patent
Zarakas et al.

(10) Patent No.: US 11,989,696 B2
(45) Date of Patent: May 21, 2024

(54) COMPUTER-BASED SYSTEMS CONFIGURED FOR AUTOMATED ELECTRONIC CALENDAR MANAGEMENT WITH MEETING ROOM LOCATING AND METHODS OF USE THEREOF

(71) Applicant: Capital One Services, LLC, McLean, VA (US)

(72) Inventors: James Zarakas, Centreville, VA (US); George Bergeron, Falls Church, VA (US); Adam Vukich, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 182 days.

(21) Appl. No.: 16/745,018

(22) Filed: Jan. 16, 2020

(65) Prior Publication Data
US 2021/0224754 A1 Jul. 22, 2021

(51) Int. Cl.
*G06Q 10/1093* (2023.01)
*G01S 19/42* (2010.01)
(Continued)

(52) U.S. Cl.
CPC ......... *G06Q 10/1095* (2013.01); *G06N 20/00* (2019.01); *H04W 4/029* (2018.02); *G01S 19/42* (2013.01)

(58) Field of Classification Search
CPC ............... G06Q 10/1095; G06Q 10/02; G06Q 10/0631; G06Q 10/06311;
(Continued)

(56) References Cited

U.S. PATENT DOCUMENTS

| 7,847,686 B1 * | 12/2010 | Atkins | H04W 4/027 340/539.13 |
| 2008/0249969 A1 * | 10/2008 | Tsui | H02J 50/001 706/46 |

(Continued)

FOREIGN PATENT DOCUMENTS

EP 3349159 A1 * 7/2018 ........... G06Q 10/025

OTHER PUBLICATIONS

Kozierok, Robyn Arlene Edelson. A learning approach to knowledge acquisition for intelligent interface agents. Diss. Massachusetts Institute of Technology, 1993. (Year: 1993).*

*Primary Examiner* — Mehmet Yesildag
*Assistant Examiner* — Thomas Yih Ho
(74) *Attorney, Agent, or Firm* — Greenberg Traurig, LLP

(57) ABSTRACT

In order to facilitate meeting room allocation and calendaring, systems and methods are disclosed including receiving electronic meeting requests to schedule a meeting. A meeting room locator machine learning model is utilized to predict meeting room parameters of a meeting room object representing a candidate meeting room based on a meeting room needs data and location information. A meeting scheduling machine learning model is utilized to predict meeting parameters of a calendar object representing a candidate meeting time based on the candidate meeting room, schedule information and the location information. An indication of the candidate meeting room and the candidate meeting time is displayed in response to the electronic meeting request on a screen associated with each attendee. A selection of the candidate meeting room and the candidate meeting time is received from each attendee, and the candidate meeting room is dynamically secured at the candidate meeting time.

20 Claims, 8 Drawing Sheets

(51) Int. Cl.
*G06N 20/00* (2019.01)
*H04W 4/029* (2018.01)

(58) Field of Classification Search
CPC ....... G06Q 10/06312; G06Q 10/06314; G06Q 10/10; G06Q 10/109; G06Q 10/1093; G06N 20/00; H04W 4/029; G01S 19/42
See application file for complete search history.

(56) References Cited

U.S. PATENT DOCUMENTS

| | | | |
|---|---|---|---|
| 2010/0153160 A1* | 6/2010 | Bezemer | G06Q 10/109 |
| | | | 705/348 |
| 2012/0150581 A1* | 6/2012 | McPhail | G06Q 10/109 |
| | | | 705/7.19 |
| 2016/0275458 A1* | 9/2016 | Meushar | G06Q 10/109 |
| 2016/0364696 A1* | 12/2016 | Balasubramanian | |
| | | | G06Q 10/1095 |
| 2017/0017928 A1* | 1/2017 | Miller | G06Q 10/1095 |
| 2017/0178080 A1* | 6/2017 | Abebe | G06F 16/383 |
| 2017/0236097 A1* | 8/2017 | Smith | G06Q 10/1095 |
| | | | 705/7.19 |
| 2018/0018592 A1* | 1/2018 | Bhattacharyya | G06Q 10/02 |
| 2018/0107987 A1* | 4/2018 | MacKenzie | G06Q 10/063116 |
| 2019/0279164 A1* | 9/2019 | Byron | G06N 5/02 |
| 2019/0303878 A1* | 10/2019 | Megahed | G06Q 10/1095 |
| 2019/0361934 A1* | 11/2019 | Rogynskyy | G06F 16/22 |
| 2020/0293999 A1* | 9/2020 | Bhattacharya | G06N 20/00 |
| 2020/0334642 A1* | 10/2020 | Vaananen | G06Q 10/1095 |
| 2021/0081878 A1* | 3/2021 | Brunn | G06N 20/00 |

* cited by examiner

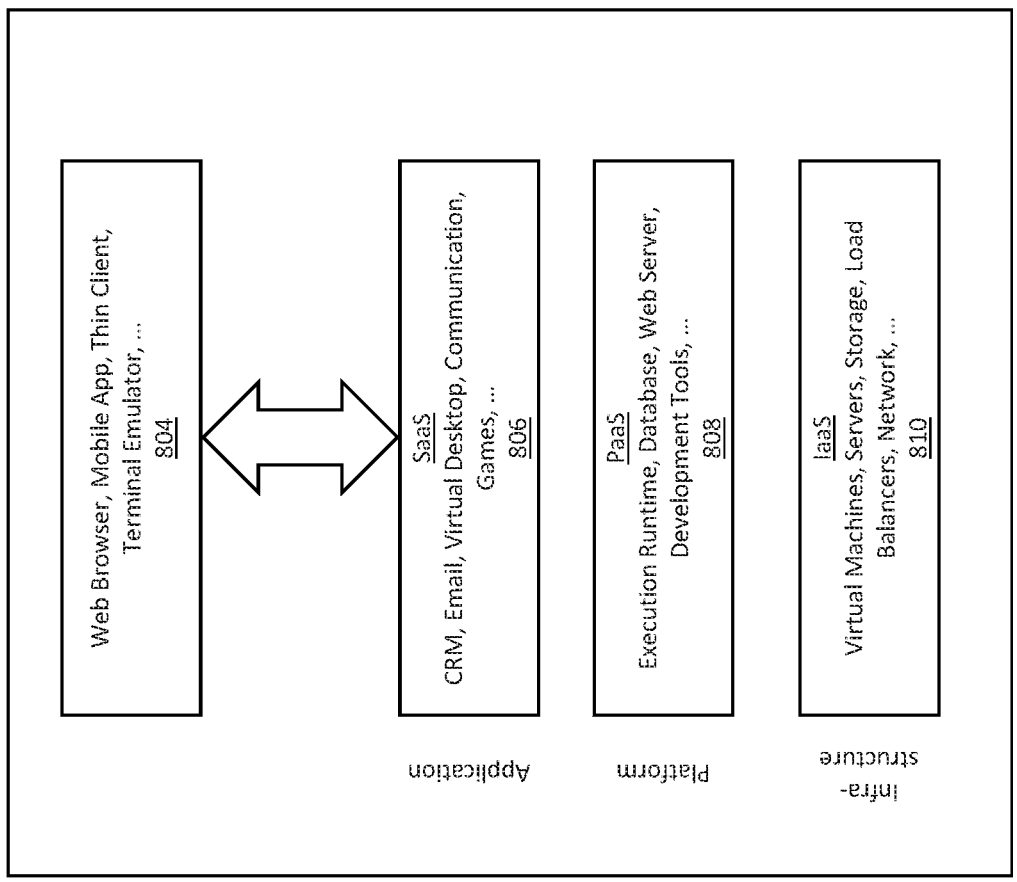

COMPUTER-BASED SYSTEMS CONFIGURED FOR AUTOMATED ELECTRONIC CALENDAR MANAGEMENT WITH MEETING ROOM LOCATING AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to improved computer-based platforms and systems, improved computing devices and components, and improved computing objects configured for one or more novel technological applications of automated electronic calendar management with meeting room locating and methods of use thereof.

BACKGROUND OF TECHNOLOGY

A computer network platform or system may include a group of computers (e.g., clients, servers, smart routers (e.g., trading smart routers)) and other computing hardware devices that are linked together through one or more communication channels to facilitate communication and resource-sharing, via one or more specifically programmed graphical user interfaces (GUIs), among a wide range of users.

SUMMARY OF DESCRIBED SUBJECT MATTER

In some embodiments, the present disclosure provides an exemplary technically improved computer-based method that includes at least the following steps of receiving, by at least one processor, a plurality of electronic meeting requests to schedule a meeting; wherein each electronic meeting request comprises an attendee data identifying at least one respective attendee of each respective meeting. Utilizing, by the at least one processor, a meeting room locator machine learning model to predict a plurality of meeting room parameters of at least one meeting room object representing the at least one candidate meeting room based at least in part on a plurality of meeting room needs data and location information associated with the respective electronic meeting request; wherein the plurality of meeting room needs data comprise: i) at least one meeting resource data identifying at least one meeting room resource that the at least one respective attendee would require at least one candidate meeting room to have, and ii) a meeting room size data identifying a meeting room size of the at least one candidate meeting room; wherein the plurality of meeting room parameters of at least one meeting room object comprises: i) a meeting location parameter, and ii) a meeting room resource parameter; wherein the location information comprises: i) an attendee location data identifying at least one respective location associated with the at least one respective attendee, ii) available meeting room data identifying all available meeting rooms, and iii) a meeting room location associated with each available meeting room. Utilizing, by the at least one processor, a meeting scheduling machine learning model to predict a plurality of meeting parameters of at least one calendar object representing at least one candidate meeting time based at least in part on the at least one candidate meeting room, schedule information associated with the respective electronic meeting request and the location information associated with the respective electronic meeting request; wherein the plurality of parameters of at least one calendar object comprises a meeting time parameter; wherein the schedule information comprises: i) an availability data identifying availability of each of the at least one respective attendee based on respective calendar data obtained from each respective electronic calendar associated with the respective at least one attendee, ii) a meeting history data identifying meeting history of the at least one respective attendee based on the respective calendar data obtained from each respective electronic calendar associated with the respective at least one attendee, wherein the meeting history data comprises: 1) cancellation data identifying meeting cancellations, and 2) rescheduling data identifying meeting rescheduling occurrences. Causing to display, by the at least one processor, an indication of the at least one candidate meeting room and the at least one candidate meeting time in response to the at least one electronic meeting request on a screen of at least one computing device associated with the at least one respective attendee based at least in part on the plurality of predicted meeting room parameters of the at least one respective meeting room object representing the at least one respective candidate meeting room and the plurality of predicted meeting parameters of at least one respective calendar object representing at least one respective candidate meeting time. Receiving, by the at least one processor, a selection of the at least one respective candidate meeting room and the at least one respective candidate meeting time from the at least one respective attendee, and dynamically securing, by the at least one processor, the at least one respective candidate meeting room at the at least one respective candidate meeting time.

In some embodiments, the present disclosure provides an exemplary technically improved computer-based method that includes at least the following steps of receiving, by the at least one processor, at least one electronic relocation request associated with a scheduled meeting; wherein each electronic relocation request comprises: i) an attendee data identifying at least one respective attendee of each respective meeting, and ii) a new meeting location. Determining, by the at least one processor, an error associated with a plurality of predicted meeting room parameters of at least one meeting room object representing at least one candidate meeting room predicted by a meeting room locator machine learning model; wherein the error associated with the plurality of predicted meeting room parameters is based at least in part on the at least one electronic relocation request and each respective plurality of predicted meeting room parameters; wherein the plurality of predicted meeting room parameters of at least one meeting room object comprises: i) a meeting location parameter, and ii) a meeting room resource parameter; wherein the location information comprises: i) an attendee location data identifying at least one respective location associated with the at least one respective attendee, ii) available meeting room data identifying all available meeting rooms, and iii) a meeting room location associated with each available meeting room. Training, by the at least one processor, the meeting room locator machine learning model based at least in part on the error associated with the plurality of predicted meeting room parameters. Utilizing, by the at least one processor, a meeting room locator machine learning model to predict a plurality of meeting room parameters of at least one meeting room object representing the at least one candidate meeting room based at least in part on a plurality of meeting room needs and location information associated with the respective electronic meeting request; wherein the plurality of meeting room needs comprise: i) at least one meeting resource data identifying at least one meeting room resource that the at least one respective attendee would require at least one candidate meeting room to have, and ii) a meeting room size data identifying a meeting room size of the at least one candidate meeting room. Causing to display, by the at least one processor, an indication of the at least one candidate meeting room in response to the at least one electronic relocation request on a screen of at least one computing device associated with the at least one respective attendee based at least in part on the plurality of predicted meeting room parameters of the at least one respective meeting room object representing the at least one respective candidate meeting room. Receiving, by the at least one processor, a selection of the at least one respective candidate meeting room from the at least one respective attendee; and dynamically securing, by the at least one processor, the at least one respective candidate meeting room at the at least one respective candidate meeting time.

In some embodiments, the present disclosure provides an exemplary technically improved computer-based system that includes at least the following components of a calendar database configured to store calendar data associated with each employee of an organization, a meeting room database configured to store meeting room characteristics of possible meeting rooms of the organization, and at least one processor in communication with the calendar database and the meeting room database. The at least one processor is configured to: receive a plurality of electronic meeting requests to schedule a meeting; wherein each electronic meeting request comprises an attendee data identifying at least one respective attendee of each respective meeting; utilize a meeting room locator machine learning model to predict plurality of meeting room parameters of at least one meeting room object representing the at least one candidate meeting room based at least in part on a plurality of meeting room needs and location information associated with the respective electronic meeting request; wherein the plurality of meeting room needs comprise: i) at least one meeting resource data identifying at least one meeting room resource that the at least one respective attendee would require at least one candidate meeting room to have, and ii) a meeting room size data identifying a meeting room size of the at least one candidate meeting room; wherein the plurality of parameters of at least one meeting room object comprises: i) a meeting location parameter, and ii) a meeting room resource parameter; wherein the location information comprises: i) an attendee location data identifying at least one respective location associated with the at least one respective attendee, ii) available meeting room data identifying all available meeting rooms, and iii) a meeting room location associated with each available meeting room; utilize a meeting scheduling machine learning model to predict a plurality of meeting parameters of at least one calendar object representing at least one candidate meeting time based at least in part on the at least one candidate meeting room, schedule information associated with the respective electronic meeting request and the location information associated with the respective electronic meeting request; wherein the plurality of parameters of at least one calendar object comprises a meeting time parameter; wherein the schedule information comprises: i) an availability data identifying availability of each of the at least one respective attendee based on respective calendar data obtained from each respective electronic calendar associated with the respective at least one attendee, ii) a meeting history data identifying meeting history of the at least one respective attendee based on the respective calendar data obtained from each respective electronic calendar associated with the respective at least one attendee, wherein the meeting history data comprises: 1) cancellation data identifying meeting cancellations, and 2) rescheduling data identifying meeting rescheduling occurrences; cause to display an indication of the at least one candidate meeting room and the at least one candidate meeting time in response to the at least one electronic meeting request on a screen of at least one computing device associated with the at least one respective attendee based at least in part on the plurality of predicted plurality of meeting room parameters of the at least one respective meeting room object representing the at least one respective candidate meeting room and the plurality of predicted meeting parameters of at least one respective calendar object representing at least one respective candidate meeting time; receive a selection of the at least one respective candidate meeting room and the at least one respective candidate meeting time from the at least one respective attendee; and dynamically secure the at least one respective candidate meeting room at the at least one respective candidate meeting time.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 1-8 show one or more schematic flow diagrams, certain computer-based architectures, and screenshots of various specialized graphical user interfaces which are illustrative of some exemplary aspects of at least some embodiments of the present disclosure.

DETAILED DESCRIPTION

Figure 1:
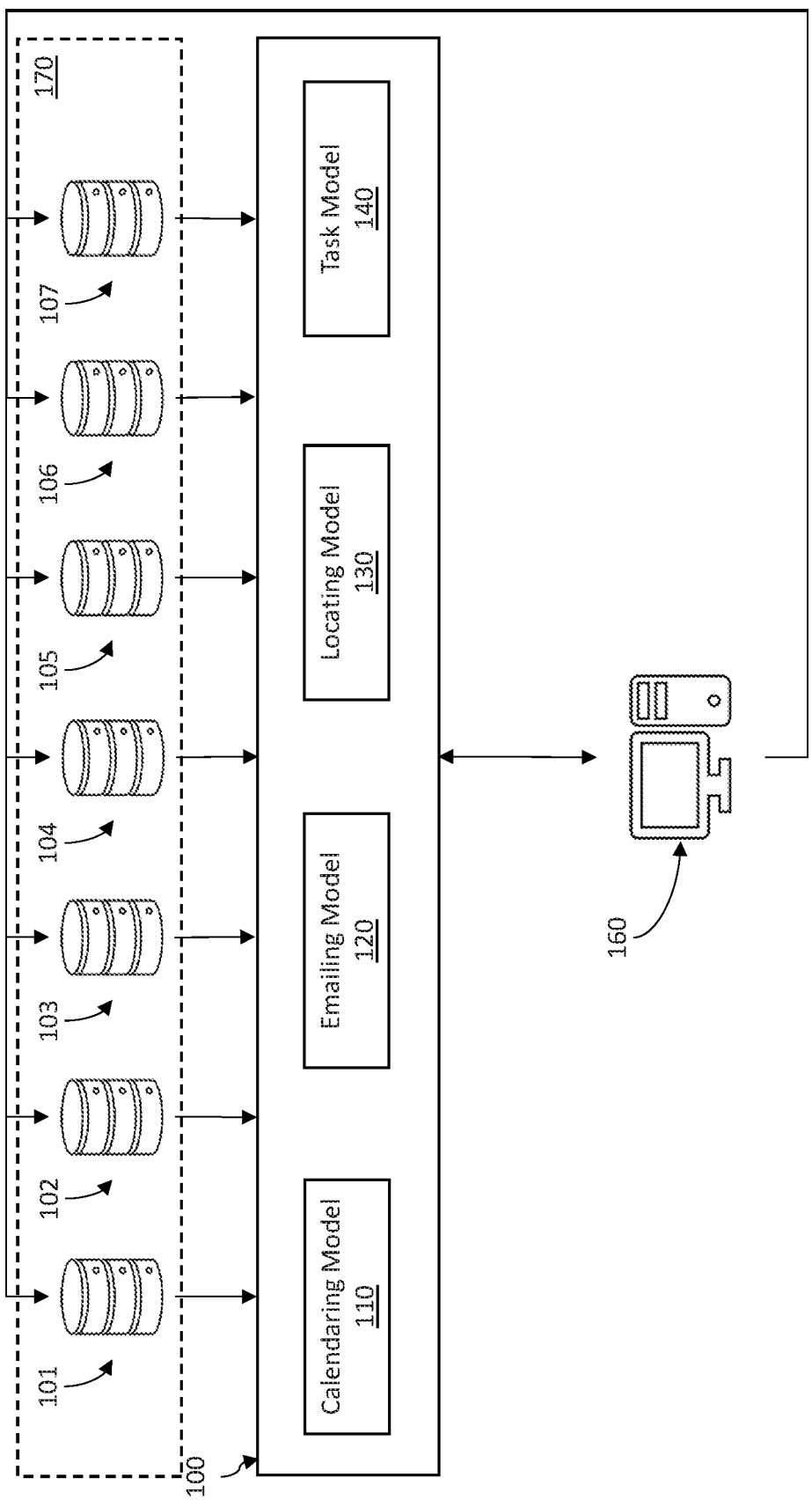

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect or functionality of various embodiments described herein can be performed in real-time and dynamically. As used herein, the term "real-time" is directed to an event or action that can occur instantaneously or almost instantaneously in time when another event or action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and linguistic relatives or derivatives, mean that certain events and actions can be triggered or occur without any human intervention. In some embodiments, events and actions in accordance with the present disclosure can be in real-time or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, specially programmed computing systems with associated devices are configured to operate in the distributed network environment, communicating with one another over one or more suitable data communication networks (e.g., the Internet, satellite, etc.) and utilizing one or more suitable data communication protocols or modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component or a combination of at least one software component and at least one hardware component which are designed, programmed, or configured to manage or control other software and hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements or software elements or both may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and computing software languages (e.g., C++, Objective-C, Swift, Java, JavaScript, Python, Perl, QT, etc.).

In some embodiments, one or more illustrative embodiments of computer-based systems of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone, PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more illustrative embodiments of computer-based systems of the present disclosure may obtain, manipulate, transfer, store, transform, generate, or output any digital object or data unit (e.g., from inside or outside of a particular application) that can be in any suitable form such as, without limitation, a file, a contact, a task, an email, a tweet, a map, an entire application (e.g., a calculator), etc. In some embodiments, as detailed herein, one or more illustrative embodiments of computer-based systems of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, illustrative embodiments of computer-based systems of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative embodiments of computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative embodiments of computer-based systems of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects or combinations thereof. For example, such projections may be a visual overlay for a mobile augmented reality (MAR) application.

In some embodiments, illustrative embodiments of computer-based systems of the present disclosure may be configured to be utilized in various applications which may include, but not limited to, gaming, mobile-device games, video chats, video conferences, live video streaming, video streaming and augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing system of the present disclosure or any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless or non-wireless communication or combination thereof; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative embodiments of computer-based systems of the present disclosure may be configured to securely store and transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 8 illustrate systems and methods of meeting rescheduling predictions using machine learning techniques and database intercommunication. The following embodiments provide technical solutions and technical improvements that overcome technical problems, drawbacks or deficiencies in the technical fields involving machine learning, database technologies, networking technologies, dynamic resource management, message coordination, among others. As explained in more detail, below, technical solutions and technical improvements herein include aspects of improved database communication and record keeping, dynamic resource management, and machine learning. Based on such technical features, further technical benefits become available to users and operators of these systems and methods. Moreover, various practical applications of the disclosed technology are also described, which provide further practical benefits to users and operators that are also new and useful improvements in the art.

FIG. 1 depicts a diagram of an exemplary illustrative collaboration system according to an illustrative embodiment of the present invention.

In some embodiments, a collaboration system 100 access schedule and communication data associated with users to facilitate collaboration between and amongst the users by providing collaborative services and functions. In some embodiments, the collaboration services include predictions as to various collaborative interactions, such as, e.g., predicting optimum meeting schedules, email prioritization, task schedules and prioritization, among other collaboration services, and generating electronic calendar and electronic communication items, such as, electronic calendar meeting invites, electronically booking locations such as meeting rooms, and electronically ordering and prioritizing communication. In some embodiments, the collaboration system 100 may automatically convey the prediction to each user involved with the collaborative interaction at a respective user computing device 160.

In some embodiments, the user computing device 160 may include a personal computer, a mobile computing device such as a tablet or smartphone, among other computing devices. In some embodiments, there may be a plurality of user computing devices 160 in communication with the collaboration system 100, such as, e.g., between about 1 and about 10 computing devices, between about 1 and about 20 computing devices, between about 1 and about 100 computing devices, or any other number of computing devices for providing collaboration services to each user of, e.g., a set of customers, an organization such as a company, corporation, foundation, family, social club, school, university, government agency, or other organization, a set of organizations, or other group of users.

In some embodiments, the collaboration system 100 receives data from multiple data sources related to user schedules, relationships and communication to facilitate comprehensive and accurate prediction of collaboration characteristics for automatically initiating collaborative interactions. In some embodiments, the data may include, e.g., user calendar data, organizational personnel data, user location data, meeting room data, user email data, user task data, user work product data, among other task, communication and schedule data. Accordingly, in some embodiments, the collaboration system 100 receives the user calendar data, the organizational personnel data, the user location data, the meeting room data, the user email data, the user task data, and the user work product data from a calendar database 101, an organization database 102, a location database 103, a meeting room database 104, an email database 105, a task database 106, and a work product database 107, respectively.

In some embodiments, the calendar database 101 may include a virtual or electronic calendar associated with each user in communication with the collaboration system 100 via a respective user computing device 160. The virtual calendar may include scheduled meetings and appointments, out-of-office periods, scheduled vacations, working hours, among other calendar-related data of each user in communication with collaboration system 100. In some embodiments, the virtual calendar may include scheduling information such as, e.g., availability and meeting history (e.g., cancellations, rescheduled meetings, relocated meeting, etc.) that are represented in a calendar program associated with each user. Examples of such calendar programs may include but are not limited to, e.g., Microsoft™ Outlook™, Google™ Calendar, Apple™ Calendar, IBM™ Notes, among other programs having virtual calendaring functions. Information entered into such programs may be stored in the calendar database 101 to aggregate scheduling information for use by the collaboration system 100.

In some embodiments, the organization database 102 may include a virtual organization chart or other representation of position hierarchy associated with each user in communication with the collaboration system 100 via a respective user computing device 160. The virtual organization chart may include a hierarchy of personnel in an organization and an organization structure, including, e.g., entry-level personnel up through senior management and executives.

In some embodiments, the location database 103 may include a representation of a location of each user in communication with the collaboration system 100 via a respective user computing device 160. The location may include, e.g., a latitude and longitude, a street address, a building identification, a room identification within a building, a floor within a building, among others and combinations thereof.

In some embodiments, the meeting room database 104 may include a list of possible meeting rooms and a representation of a location of each room listed as a possible meeting room. The location may include, e.g., a latitude and longitude, a street address, a building identification, a room identification within a building, a floor within a building, among others and combinations thereof.

In some embodiments, the email database 105 may include, e.g., an archive of sent and received emails associated with each user in communication with the collaboration system 100. In some embodiments, the emails may include, e.g., metadata, text, attachments, media, recipients, senders, carbon-copy (CC) recipients, among other data associated with each email. In some embodiments, the emails may be extracted or otherwise received from an email program or service associated with each user. Examples of such email programs or services may include but are not limited to, e.g., Microsoft™ Outlook™, Google™ Gmail™, Apple™ Mail, IBM™ Notes, among other email programs and services. Information entered into such programs may be stored in the calendar database 101 to aggregate scheduling information for use by the collaboration system 100.

In some embodiments, the task database 106 may include a history of work tasks assigned to each user. In some embodiments, the history may include, e.g., start dates, completion dates, start times, completion times, task subject, task project, collaborators and team-mates associated with each task, among other task related data. In some embodiments, the task database 106 may receive the task history from project management, task management and task tracking platforms and programs, such as, e.g., Jira™, Microsoft Dynamics™, NetSuite™, Launchpad™, among others and combinations thereof.

In some embodiments, the work product database 107 may include a history of work product produced by each user in communication with the collaboration system 100. In some embodiments, the work product may include completed projects, such as, e.g., papers, administrative documents, published documents, documents submitted to, e.g., supervisors or project management platforms as complete, source code, software releases, among other types of work product. The work product database 107 may include, e.g., a document repository, a document storage, a cloud storage platform, a server database, a distributed database, among others.

As used herein, a "database" refers to any suitable type of database or storage system for storing data. A database may include centralized storage devices, a distributed storage system, a blockchain network, and others, including a database managed by a database management system (DBMS). In some embodiments, an exemplary DBMS-managed database may be specifically programmed as an engine that controls organization, storage, management, and retrieval of data in the respective database. In some embodiments, the exemplary DBMS-managed database may be specifically programmed to provide the ability to query, backup and replicate, enforce rules, provide security, compute, perform change and access logging, and automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and objects. In some embodiments, the exemplary DBMS-managed database may be specifically programmed to include metadata about the data that is stored.

In some embodiments, the collaboration system 100 may include models for performing multiple collaborative services. In some embodiments, the collaboration system 100 includes a calendaring model 110 to, e.g., automatically schedule, reschedule and cancel meetings, appointments, out-of-office periods, unavailability periods, and other virtual calendar items associated with users based on data from one or more of the calendar database 101, the organization database 102, the location database 103, the meeting room database 104, the email database 105, the task database 106, and the work product database 107. In some embodiments, the calendaring model 110 may include, e.g., machine learning models, such as, e.g., one or more exemplary AI and machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture or model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments, the calendaring model 110 may, e.g., employ the AI and machine learning techniques to predict an optimum meeting between attendees based on, e.g., location data, meeting room data, and schedule information including, e.g., calendar data such as availability and meeting history (e.g., cancellations, rescheduling, etc.) among others. Based on such data received from, e.g., the calendar database 101, the location database 103, and the meeting room database 104, the machine learning model may predict a place and time that is least likely to be cancelled or rescheduled. In some embodiments, the machine learning model may incorporate organizational hierarchies from the organization database 102 to prioritize the schedule and location of attendees higher in the hierarchy.

In some embodiments, the calendaring model 110 may employ the machine learning model or AI and machine learning techniques as described above to, e.g., schedule meetings, schedule uninterrupted work time or unavailability periods, among other electronic calendar items. Such scheduled meetings may be scheduled automatically based on, e.g., location data, meeting room data, and schedule information including, e.g., calendar data such as availability and meeting history (e.g., cancellations, rescheduling, etc.) among others, from the location database 103, the meeting room database 104 or the calendar database 101.

In some embodiments, the collaboration system 100 includes an emailing model 120 to, e.g., determine an order of priority of received emails. In some embodiments, the collaboration system 100 may receive electronic messages, including emails, instant message communications, simple message service (SMS) messages, among other electronic message formats. In some embodiments, the emailing model 120 may receive or determine indicators of attributes of the electronic messages, such as, e.g., sender, recipient or recipients, carbon-copied (cc' d) recipients, subject line text, electronic message text, attached files and media, hyperlinks, urgency markers, read-receipts, associated conversations for each electronic message, related calendar events, such as a calendar event created with the electronic message or a calendar event for which the electronic message is a response, among other attributes. In some embodiments, the emailing model 120 may include, e.g., AI and machine learning techniques, such as those described above, to form parameters from one or more of the attributes, such as, e.g., subject line text, sender including data from the organization database 102, and related calendar events including calendar data from the calendar database 101 by correlating each of the attributes with a likelihood of the user viewing, responding to, forwarding, deleting, delaying, or otherwise interacting with the electronic message.

In some embodiments, using the parameters, the AI and machine learning techniques of the emailing model 120 may predict a level of priority of each electronic message. In some embodiments, the level of priority may be a priority scale, such as a numeric scale in a range of between about 1 and about 10, between about 1 and about 5, between about 1 and about 100, or other range. In some embodiments, the level of priority may include a relative level of priority, where the emailing model 120 ranks each electronic message according to a relative priority level compared to each other electronic message. Accordingly, in some embodiments, a user may be presented with a list of electronic messages in an order of priority such that the most important or actionable electronic messages may be presented first. In some embodiments, the collaboration system 100 includes a locating model 130 to, e.g., optimize a location of a meeting based on, e.g., location data from the location database 103 and meeting room data from the meeting room database 104. In some embodiments, the locating model 130 employs AI and machine learning techniques, such as those described above, to predict an optimum location for a meeting that will reduce the likelihood of the meeting being cancelled, rescheduled or relocated. In some embodiments, the optimum location depends on a location of each attendee to a meeting as well as a location of each available meeting room for the meeting. In some embodiments, the locating model 130 may also take into account meeting room resources, such as, e.g., video conferencing equipment, technology support, size, furniture, among other features of a meeting room. In some embodiments, the predicted optimum location can be provided to the calendar model 110, which may, in turn, automatically schedule a meeting using the predicted optimum meeting location.

In some embodiments, the collaboration system 100 includes a task model 140 to, e.g., automatically schedule calendar events to perform a task associated with one or more meetings based on, e.g., email data from the email database 105 associated with emails related to the meetings, task data from the task database 106 associated with current and past tasks of each attendee, and work product data from the work product database 107 associated with completed work product of each attendee. In some embodiments, the task model 140 interacts with the calendar model 110 to determine tasks associated with an upcoming meeting, a time to complete the tasks, and attendees associated with the task. To do so, in some embodiments, the task model 140 employs AI and machine learning techniques, such as those described above, to predict a task parameter leading up to the meeting. The task parameter can be used by the calendar model 110 to automatically determine a task time and location for the associated attendees to complete the task prior to the meeting. In an embodiment, the calendar model 110 may then automatically schedule the task time and location each attendee's respective calendar to facilitate private, uninterrupted work time.

Figure 2:
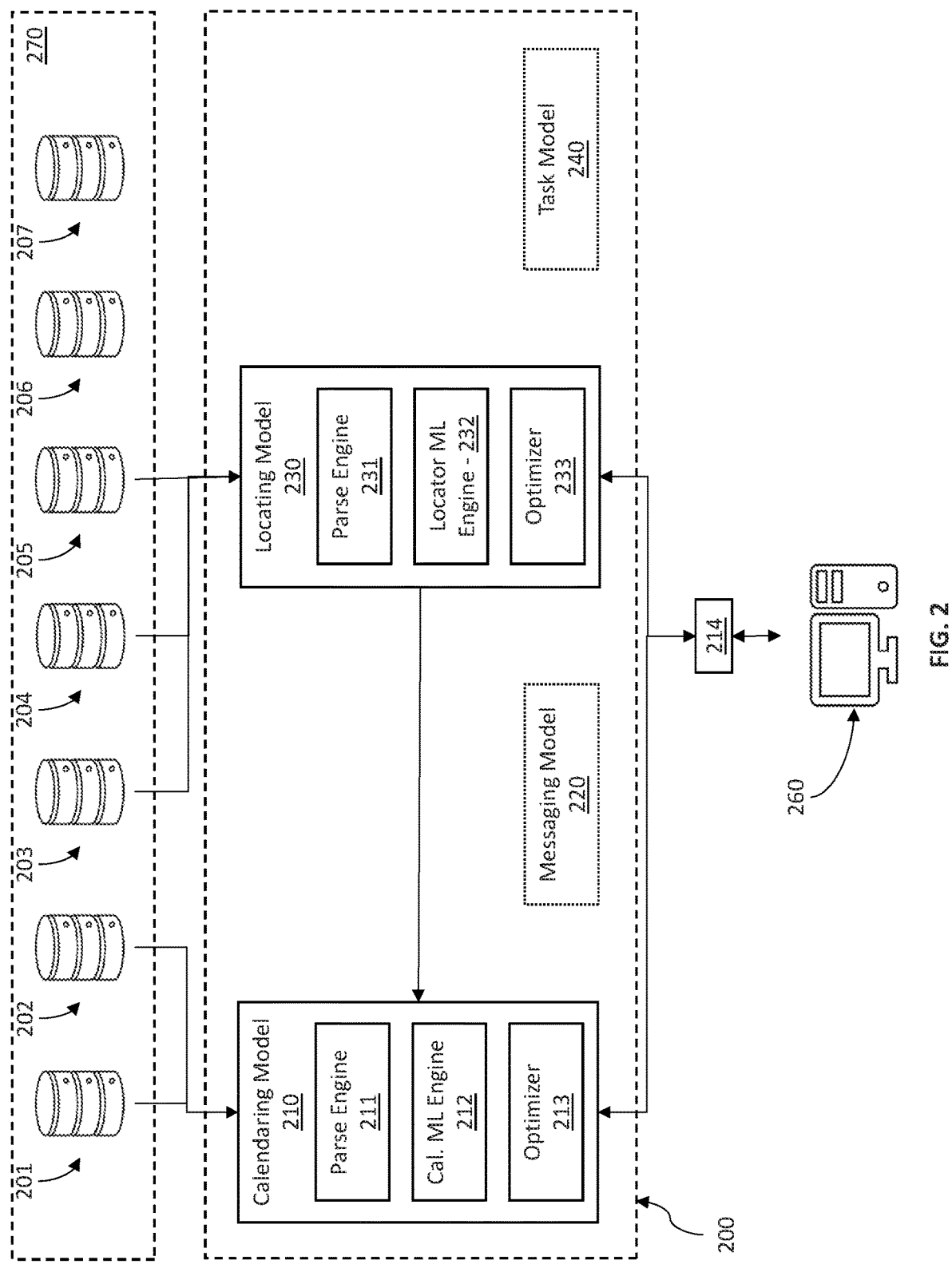

FIG. 2 depicts a diagram of a calendaring model for an exemplary illustrative automated calendar management system in accordance with an illustrative embodiment of the present invention.

In some embodiments, a collaboration system 200 includes a calendaring model 210 in communication with collaboration databases, such as, a calendar database 201, an organization database 202, a location database 203 and a meeting room database 204, among other suitable databases for providing information for calendar and meeting collaboration. In some embodiments, the calendaring model 210 is also in communication with a locating model 230. The locating model 230 may communication with, e.g., the location database 203 and the meeting room database 204 to provide location predictions for the calendaring model 210. In some embodiments, each of the collaboration databases may include data in a suitable format, such as, e.g., tables, text, tuples, arrays, etc. Each data item in the collaboration databases may also include metadata associated with information such as, e.g., origin of the data, destination, format, time and date, geographic location information, source identifier (ID), among other information.

In some embodiments, the locating model 230 may leverage data in the location database 203 and the meeting room database 204, including associated metadata, to predict, e.g., optimum meeting locations based on location information associated with the attendees as well as available meeting rooms, and meeting room resources. In some embodiments, the calendaring model 210 may leverage the data in the calendar database 201, the organization database 202 and from the locating model 230, including associated metadata, to predict optimum meeting times based, e.g., on scheduling information related to attendees, and dynamically secure a meeting room at the predicted time according to the location predicted by the locating model 230, among other functions.

In some embodiments, the calendaring model 210 may predict the meeting times at associated meeting rooms in response to a user interaction 214 from a user computing device 260. In some embodiments, the electronic meeting request includes attendee data that identifies each attendee of the meeting invite. In some embodiments, the user interaction 214 causes the locating model 230 to predict the optimal meeting location, including an optimal meeting room. The optimal location may be provided to the calendaring model 210 to complete the scheduling of a meeting by determining an optimum time to hold a meeting at the optimal location based on each of the attendees listed in the electronic meeting request. In some embodiments, the user interaction 214 includes, e.g., an electronic calendar invite communicated as an electronic meeting request.

In some embodiments, the locating model 230 may receive the electronic meeting request 214 and utilize a parse engine 231 to determine the meeting attendees and any meeting room needs, such as, e.g., teleconferencing equipment, audio-visual equipment, computer equipment, microphones, speakers, or other equipment. The parse engine 231 may analyze, e.g., text, tags, comments, text or other data included with the electronic meeting request 214 and recognize with, e.g., a machine learning model such as a classifier or other recognition algorithm, the attendees and meeting room needs for a meeting resulting from the electronic meeting request 214. Based on the recognized attendees and meeting room needs, the parse engine 231 may receive, e.g., attendee communications, attendee location data and meeting room data from the email database 205, the location database 203 and meeting room database 204, respectively. In some embodiments, the parse engine 231 may extract features from each of the electronic meeting request 214, the location data and the meeting room data. In some embodiments, a locator machine learning engine 232 may utilize the features to predict meeting room parameters, such as a meeting room resources and meeting room location, based on training according to historical meeting room selections for meetings. In some embodiments, an optimizer 233 may optimize the parse engine 231 or the locator machine learning engine 232 according to, e.g., an error of the predicted task parameters based on, e.g., attendee feedback. In some embodiments, each of the parse engine 231, locator machine learning engine 232 and the optimizer 233 may include, e.g., software, hardware or a combination thereof.

In some embodiments, the parse engine 231 may transform the data as well as the electronic meeting request 214 into, e.g., feature vectors or feature maps such that the locator machine learning engine 232 may generate meeting room predictions based on features of the data. Thus, in some embodiments, the parse engine 231 may receive the data, parse the data, and extract features according to a feature extraction algorithm. Data parsing and feature extraction may utilize methods depending on a type of data being received. For example, the parse engine 231 may include language parsing when the data includes text and character strings. Thus, in some embodiments, the parse engine 231 may include, e.g., a classifier for natural language recognition. However, in some embodiments, the data may be a table. In such a case, the parse engine 231 may simply extract features into, e.g., a feature vector directly from the data. However, in some embodiments, the data may include a combination of character strings, as well as structured data, such as tables, tuples, lists, arrays, among other. Thus, in some embodiments, the parse engine 231 may include model or algorithm for parsing the character strings and then extracting feature vectors from the structured data and the parsed character strings.

In some embodiments, the feature extraction algorithm may include, e.g., independent component analysis, an isomap, kernel principle component analysis (PCA), latent semantic analysis, partial least squares, principal component analysis, multifactor dimensionality reduction, nonlinear dimensionality reduction, multilinear PCA, multilinear subspace learning, semidefinite embedding, autoencoding, among others and combinations thereof. As a result, the parse engine 211 may generate feature vectors having, e.g., availability and meeting history features, personnel features, attendee location features, available meeting room features, and out-of-office features, among other possible features.

In some embodiments, the feature vectors produced by the parse engine 231 may be employed by the locator machine learning engine 232 to develop a prediction for an optimum work task duration for an attendee to perform the requisite work task. In some embodiments, the locator machine learning engine 232 is configured to make at least one prediction in response to the feature vectors: an optimum meeting location and meeting room resources. In some embodiments, the locator machine learning engine 232 may utilize, e.g., classification machine learning techniques to develop a prediction from the work product features and prior work task features for each attendee having a respective work task to complete.

For example, in some embodiments, the locator machine learning engine 232 may include, e.g., a convolutional neural network (CNN) having multiple convolutional layers to receive a feature map composed of each of the feature vectors, convolutionally weight each element of the feature map using the convolutional layers, and generate an output including the meeting room parameters representing a candidate meeting room for the meeting of the electronic meeting request 214.

In some embodiments, the calendaring model 210 may use the collaboration databases 270 and the meeting room parameters to predict a meeting time for the attendees to meet in the candidate meeting room. The calendaring model 210 may receive the data and employ a parse engine 211, a calendar machine learning engine 212 and an optimizer 213 to deduce a correlation between the data and an optimum meeting schedule, including the meeting time. In some embodiments, each of the parse engine 211, calendar machine learning engine 212 and the optimizer 213 may include, e.g., software, hardware or a combination thereof. For example, in some embodiments, the parse engine 211 may include a processor and a memory, the memory having instructions stored thereon that cause the processor to parse data. In some embodiments, the calendar machine learning engine 212 may include a processor and a memory, the memory having instructions stored thereon that cause the processor to predict optimum meeting times and locations from the parsed data. In some embodiments, the optimizer 213 may include a processor and a memory, the memory having instructions stored thereon that cause the processor to optimize the parse engine 211 or the calendar machine learning engine 212 according to, e.g., an error of the predicted meeting time and location based on, e.g., user feedback.

In some embodiments, the parse engine 211 may transform the data as well as the user interaction 214 including the electronic meeting request into, e.g., feature vectors or feature maps such that the calendar machine learning engine 212 may generate meeting schedule predictions based on features of the data. Thus, in some embodiments, the parse engine 211 may receive e.g., the meeting room parameters, calendar data for attendee from the calendar database 201 and personnel data for each attendee from the organization database 202, parse the data, and extract features according to a feature extraction algorithm. Data parsing and feature extraction may utilize methods depending on a type of data being received. For example, the parse engine 211 may include language parsing when the data includes text and character strings. Thus, in some embodiments, the parse engine 211 may include, e.g., a classifier for natural language recognition. However, in some embodiments, the data may be a table. In such a case, the parse engine 211 may simply extract features into, e.g., a feature vector directly from the data. However, in some embodiments, the data may include a combination of character strings, as well as structured data, such as tables, tuples, lists, arrays, among other. Thus, in some embodiments, the parse engine 211 may include model or algorithm for parsing the character strings and then extracting feature vectors from the structured data and the parsed character strings.

In some embodiments, the feature extraction algorithm may include, e.g., independent component analysis, an isomap, kernel principle component analysis (PCA), latent semantic analysis, partial least squares, principal component analysis, multifactor dimensionality reduction, nonlinear dimensionality reduction, multilinear PCA, multilinear subspace learning, semidefinite embedding, autoencoding, among others and combinations thereof. As a result, the parse engine 211 may generate feature vectors having, e.g., availability and meeting history features, personnel features, attendee location features, available meeting room features, and out-of-office features, among other possible features.

In some embodiments, the feature vectors produced by the parse engine 211 may be employed by the calendar machine learning engine 212 to develop a prediction for an optimum meeting time according to according to scheduling information from the collaboration databases and the candidate meeting room from the locator model 230. In some embodiments, the calendar machine learning engine 212 is configured to predict a meeting time for which to meet in the candidate meeting room. In some embodiments, the calendar machine learning engine 212 may also make at least two additional predictions in response to the feature vectors: a set of assigned attendees assigned to the work task of the unavailability period time, and an optimum unavailability period location for the attendees in the set of assigned attendees to meet and complete the work task. In some embodiments, the calendar machine learning engine 212 may utilize, e.g., classification machine learning techniques to develop a prediction from the availability and meeting history features, personnel features, attendee location features, and available meeting room features for each work task of the electronic meeting request 214. In some embodiments, the result of this prediction process produces a meeting time parameter that corresponds to a candidate meeting time representing an optimal time to meet at in the candidate meeting room.

For example, in some embodiments, the calendar machine learning engine 212 may include, e.g., a convolutional neural network (CNN) having multiple convolutional layers to receive a feature map composed of each of the feature vectors, convolutionally weight each element of the feature map using the convolutional layers, and generate an output representing the meeting time parameter. However, in some embodiments, the calendar machine learning engine 212 may include multiple models, each for predicting a different meeting time parameter or meeting time parameters for multiple electronic meeting requests 214.

In some embodiments, the calendar machine learning engine 212 may then convert the meeting time parameter and the meeting room parameter into a meeting request to submit to each attendee of the electronic meeting request 214. In some embodiments, the meeting request is transmitted to the user computer 260 to produce a meeting request indication for the user to select, decline, or modify. The selection or modification may cause the collaboration system 200 to automatically book a meeting room associated with the candidate meeting room location and the candidate meeting time represented by the meeting location parameter and meeting time parameter, respectively.

In some embodiments, one or more of the user and attendees may accept, decline or modify the meeting request with a response. The response or responses may then be returned to an optimizer 213 that evaluates the meeting room location parameter and the meeting time parameter against a ground truth. Here, the ground truth may be the responses associated with the meeting request. Thus, in effect, each response to the meeting request may be used as feedback into the optimize 213 to optimize the calendaring model 210 for on-line learning. Thus, in some embodiments, the optimizer 213 may determine an error associated with the predicted unavailability period location parameter and unavailability period time parameter as compared to the time and location of the meeting request and whether the meeting request was accepted or not. In some embodiments, the optimizer 213 may backpropagate the error to the parse engine 211, the calendar machine learning engine 212, or both to train each engine in an on-line fashion.

Figure 3:
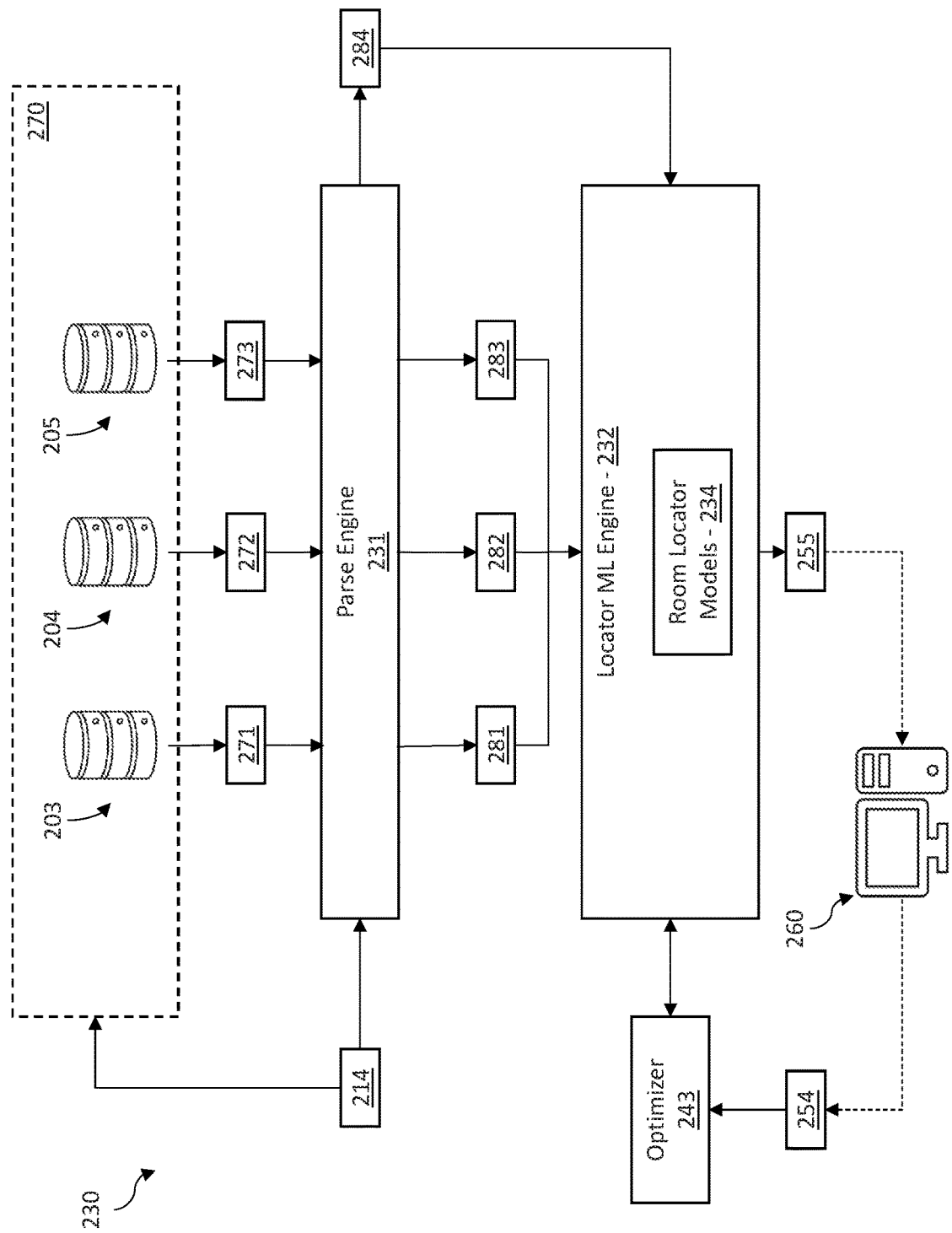

FIG. 3 depicts a diagram of a task model for an exemplary illustrative automated calendar management system in accordance with an illustrative embodiment of the present invention.

In some embodiments, an electronic meeting request 214 is received by a locating model 230. The electronic meeting request 214 may include data including attendee data indicating a list of attendees invited to the meeting associated with the electronic meeting request 214. However, in some embodiments, each attendee may be in a different location, for example, different offices, different floors of a building, different buildings within a geographic area, and different geographic areas. Thus, coordinating a location for a meeting can be difficult because ability to access the location can vary greatly amongst the attendees. For example, one or more of the attendees may be in a different building from the selected meeting room and may need to travel to attend the meeting in person. As another example, one or more attendees may not be able to attend the meeting in room in person, and thus must be able to teleconference and telephone into the meeting. Thus, determining a location for a meeting may be facilitated by balancing aspects such as, e.g., transit time, likelihood of in-person attendance, resource needs (e.g., for those not attending in person or for tasks and agenda items of the meeting), among other factors.

In some embodiments, to efficiently and accurately optimize a meeting location, a parse engine 231 of the locating model 230 may, in response to the electronic meeting request 214, receive data concerning the attendees, attendee locations, available meeting rooms, available meeting room locations, and meeting agendas, from the electronic meeting request 214 itself as well as the collaboration databases 270.

The electronic meeting request 214 may include, e.g., a list of attendees, a date range, a subject and or text related to a subject of the meeting, among other text and data related to the meeting. In some embodiments, a parse engine 231 may receive the electronic meeting request 214 and parse it to identify, e.g., attendee data, data range data, and subject data, among other possible data. The parse engine 231 may employ, e.g., a suitable text recognition algorithm or model to determine the data from, e.g., text and characters, structured data such as tables, lists, tuples, arrays, etc., among other forms of information in the electronic meeting request 214. Thus, in some embodiments, the parse engine 231 may determine structured data regarding attendees, dates and subjects associated with the electronic meeting request 214. However, in some embodiments, the electronic meeting request 214 may be configured to be in a structured form that is structured to match the data contained therein with data in the collaboration databases 270.

In some embodiments, the data from the electronic meeting request 214, whether preformatted or parsed by the parse engine 231 to identify the data, may be used to pull similar or matching data from the collaboration databases 270 including, e.g., the location database 203, the meeting room database 204, the emailing database 205, among others. The matching may be performed according to, e.g., a classification algorithm, a clustering algorithm, a data look-up methodology, or other form of matching. Thus, in some embodiments, similar or related, e.g., location data 271 for each user, meeting room data 272 and email data 273 may be identified and received by the parse engine 231 from the collaboration databases 270. In some embodiments, collaboration databases 270 such as the location database 203, the meeting room database 204, the emailing database 205, may receive the electronic meeting request 214 directly to each separately perform matching and communicate the matching results to the parse engine 231.

In some embodiments, the location data 271 may include a historical record of location and a default location of each individual attendee, including, e.g., address, building, room within a building, floor, among other location information. For example, in some embodiments, individuals carry, e.g., an access card that is used to access certain facilities or equipment. Each time the individual access the facilities or equipment, a log of the location may be provided to the location database 203 along with a date and time. As a result, the location database 203 may record location habits of each attendee including, e.g., a default location such as an office or cubicle or other location where the individual is most likely to be. In some embodiments, rather than an access card, the individual carries a global positioning system (GPS) or other positioning system enabled device to more precisely log the location habits of the individual. In some embodiments, the positioning system and access card are used in conjunction. However, in some embodiments, the location database 203 records location as acquired from electronic meeting items in each individual's electronic or virtual calendar, including a specified location for each electronic meeting item. In some embodiments, in response to the electronic meeting request 214, the parse engine 231 may pull, or the location database 203 may provide location data 271 including a location history for each attendee.

In some embodiments, the meeting room data 272 may include, e.g., an index or table of available meeting rooms in which to meeting. The meeting room data 272 may include, e.g., a meeting room location, including e.g., address, building, room within a building, floor, among other location information, meeting room size or occupant capacity, meeting room resources, including teleconferencing equipment, computer equipment, television screens, speakers, microphones, among other resources, and meeting room availability according to bookings of each meeting room, as well as any other suitable data. In some embodiments, based on a number of attendees in the electronic meeting request 214, the parse engine 231 may pull, or the meeting room database 204 may provide meeting room data 272 associated with a set of meeting rooms, such as all possible meeting rooms, all meeting rooms available within a predetermined time-frame, all meeting rooms having sufficient capacity for all attendees, among other possible subsets of meeting rooms.

In some embodiments, the email data 273 may include emails matched to the electronic meeting request 214 as related to the meeting. Such a match may be determined based on a comparison between, e.g., attendees of the electronic meeting request 214 and senders and recipients of emails in the email database 205, subject of the electronic meeting request 214 and subjects or information in the email body of each email in the email database 205, among other comparisons to determine related emails.

In some embodiments, the electronic meeting request 214 and the related email data 273 may assist with determining resources required for the meeting. In some embodiments, the parse engine 231 may receive the email data 273, for example, by comparing the subject of email data 273 and the electronic meeting request 214 with subjects or names of attendees in the electronic meeting request 214.

In some embodiments, the location data 271, the meeting room data 272, the email data 273 or the electronic meeting request 214 may include unstructured data, such as, e.g., text strings, characters, images, among other unstructured data. Accordingly, the parse engine 231 may include, e.g., include language parsing when the data includes text and character strings, object recognition or optical character recognition or images, among other data recognition techniques. However, in some embodiments, the location data 271, the meeting room data 272, the email data 273 or the electronic meeting request 214 may be pre-formatted according to a suitable format including, e.g., tables, tuples, lists, arrays, among other data formats.

In some embodiments, the parse engine 231 may extract features from the parsed and formatted location data 271, meeting room data 272, email data 273 or electronic meeting request 214 according to, e.g., a feature extraction algorithm or technique. In some embodiments, the feature extraction algorithm or technique may include, e.g., independent component analysis, an isomap, kernel principle component analysis (PCA), latent semantic analysis, partial least squares, principal component analysis, multifactor dimensionality reduction, nonlinear dimensionality reduction, multilinear PCA, multilinear subspace learning, semidefinite embedding, autoencoding, among others and combinations thereof. As a result, the parse engine 231 may generate feature vectors having, e.g., the location features 281, the meeting room features 282, the email features 283 and meeting request features 284. In some embodiments, the feature vectors are aggregated into a feature map prior to modeling in the locator machine learning engine 232. In some embodiments the feature vectors are provided to the locator machine learning engine 232 as separate feature vectors.

In some embodiments, the locator machine learning engine 232 receives the feature vectors from the parse engine 231, including, but not limited to, the location features 281, the meeting room features 282, the email features 283 and meeting request features 284. In some embodiments, the locator machine learning engine 232 employs room locator models 234, such as a meeting room locator machine learning model, to determine an optimum location balancing each attendee's most likely location with meeting room location and resources needs. For example, in some embodiments, based on the location histories represented by the location features 281, the room locator models 234 may employ trained models that have been trained with this history to correlate attendee locations to specific meeting rooms that balance an ability or likelihood of each attendee to attend in person and resources available for remote attendance. For example, an attendee located in a building across town may be predicted to have a low likelihood of attending the meeting due to, e.g., distance and traffic, but high likelihood of attending by telephone or teleconference.

Thus, in some embodiments, the room locator models 234 may predict a meeting room that has occupancy needs that do not include that attendee, but includes resource needs that includes teleconferencing equipment. In some embodiments, the room locator models 234 are trained to take into account distance, traffic, available transport modes, transport costs, among other location information into a probability of attendance. Accordingly, in some embodiments, the locator models 234 include an attendance model for predicting an attendance parameter representing a probable degree of attendance of the attendees in the electronic meeting request 214. A subsequent model, such as the meeting room locator machine learning model, may then determine, based on the attendance parameter, meeting room parameters 255 representative of a candidate meeting room according to the resulting size and resource needs of the meeting room that most efficiently balance transit to the meeting among attendees that will attend in person. However, in some embodiments, the meeting room locator machine learning model of the room locator models 234 determines both the attendance parameter and the meeting room parameters 255. In some embodiments, the meeting room locator machine learning model of the room locator models 234 determines just the meeting room parameters 255 including both likely attendance and optimal candidate meeting room.

In some embodiments, the predicted meeting room parameters 255 may be presented to a user, e.g., as part of an electronic calendar appointment at a user computing device 260. In response, a user may provide a user selection 254 including an acceptance, rejection, or modification of the electronic calendar appointment based on the candidate meeting room. In some embodiments, the user selection 254 may be provided to an optimizer 233 of the locating model 230. In some embodiments, the optimizer 233 may compare the user selection 254 to the corresponding predicted meeting room parameters 255. Based on a difference between the user selection 254 to the corresponding predicted meeting room parameters 255, the optimizer 233 may determine an error in the predictions by the locator machine learning engine 232. In some embodiments, the optimizer 233 back-propagates the error to the locator machine learning engine 232 to train the locator estimation models 234 in an on-line fashion such that each prediction may be used as a training pair with the corresponding user selection. Thus, the room locator models 234 may be updated as users provide user selections 254 to continually improve the room locator models 234. In some embodiments, the optimizer 233 may employ optimization models including, but not limited to, e.g., gradient descent, regularization, stochastic gradient descent, Nesterov accelerated gradient, Adagrad, AdaDelta, adaptive momentum estimation (AdaM), root-mean-square propagation (RMS Prop), among others and combinations thereof.

In some embodiments, the user selection 254 may be a second selection after an initial selection. For example, where a user initially accepts, e.g., an appointment based on the predicted meeting room parameters 255 via the user selection 254, the user may later cancel the appointment by a second user selection 254. The second user selection 254 may be provided to the optimizer 233 in a similar fashion to the initial user selection 254 to determine an error and train the locator machine learning engine 232.

Figure 4:
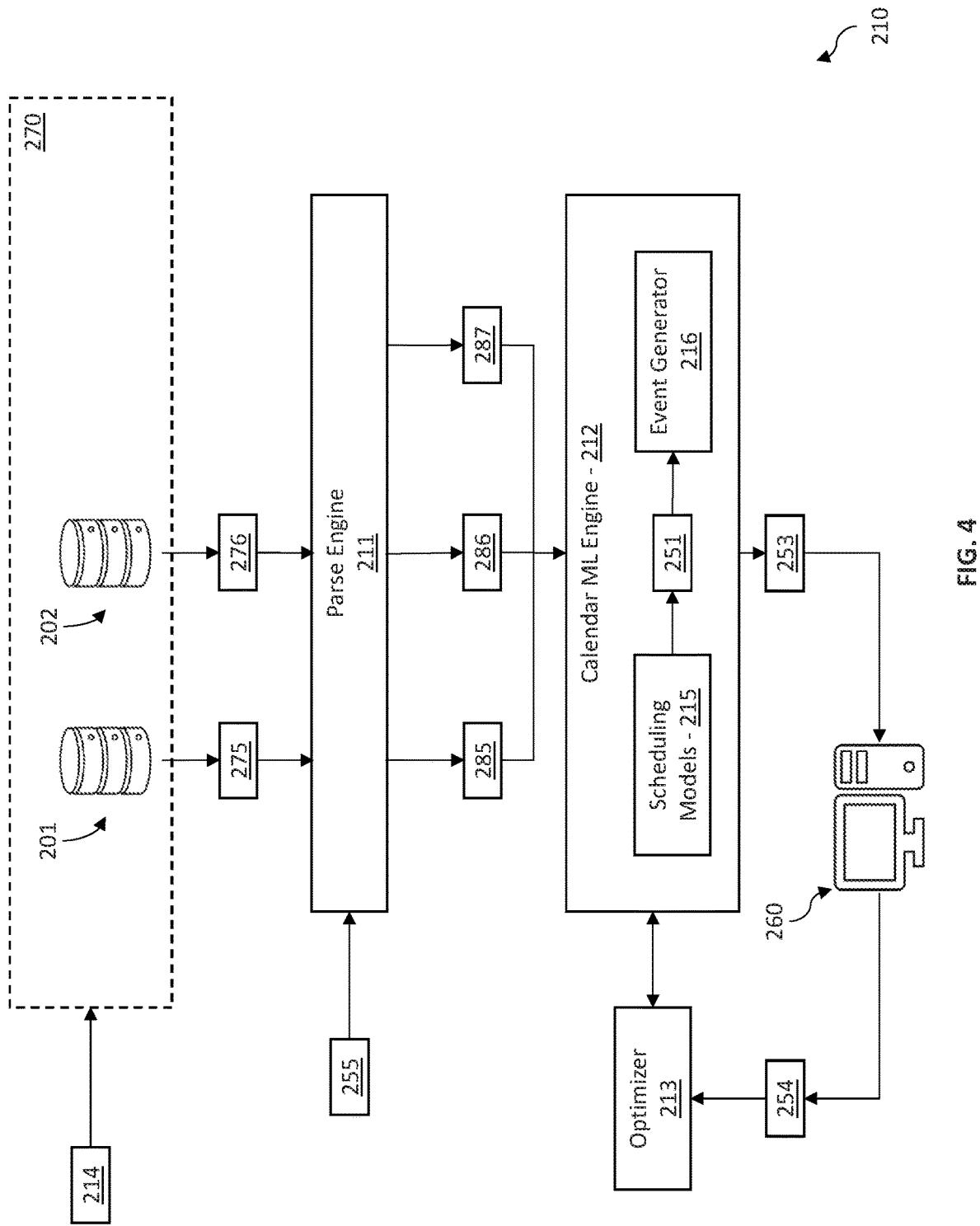

FIG. 4 depicts a diagram of a calendaring model for an exemplary illustrative automated calendar management system in accordance with an illustrative embodiment of the present invention.

In some embodiments, a collaboration system 200 may initiate an automated meeting scheduling process upon receipt of an electronic meeting request, such as the electronic meeting request 214 described above. In some embodiments, the electronic meeting request 214 includes an identification of the associated attendees. In some embodiments, the electronic meeting request 214 as well as meeting room parameters 255 predicted by a locating model, such as the locating model 230 described above, are provided to a calendar model 210 to schedule the meeting for each attendee and secure a meeting room. In some embodiments, the predicted meeting room parameters 255 includes, e.g., a predicted meeting room according to a location and resources. In some embodiments, the predicted meeting room parameter 255 may include data formatted for the calendar model 210 and ready to undergo feature extraction. However, in some embodiments, the predicted meeting room parameter 255 may include an image, character string, or other unstructured data. In some embodiments, where the predicted meeting room parameter 255 is unstructured, the parse engine 211 may parse the predicted meeting room parameter 255 using, e.g., a parsing algorithm such as a natural language recognition model, an image recognition model, or other algorithm.

In some embodiments, based on the predicted meeting room parameters 255, the calendar model 210 may pull data from collaboration databases 270 including each of the calendar database 201, and the organization database 202 associated with, e.g., attendees of the electronic meeting request 214. Accordingly, the parse engine 211 may receive availability and scheduling information data 275 from the calendar database 201 related to meetings within a given period, e.g., within about one week, within about one month, within about six months, or other period. Similarly, the parse engine 211 may receive personnel data 276 from the organization database 202.

In some embodiments, the organization database 202 may utilize the attendees identified by the calendar database 201 to identify attendee hierarchy within an associated organization according to, e.g., an organization chart or other data related to personnel hierarchy for the associated organization. The organization database 202 may provide the attendee hierarchy based on the, e.g., organization chart, to the parse engine 211 as personnel data 276 associated with each attendee of the electronic meeting request 214.

In some embodiments, the parse engine 211 may receive each of the predicted meeting room parameters 255, the availability and meeting history data 275 and the personnel data 276 and extract features. Thus, in some embodiments, the parse engine 211 may transform the data into, e.g., feature vectors or feature maps. Thus, in some embodiments, the parse engine 211 may receive the data, parse the data, and extract features according to a feature extraction algorithm. Data parsing and feature extraction may utilize methods depending on a type of data being received. For example, the parse engine 211 may include language parsing when the data includes text and character strings. In some embodiments, the parse engine 211 may include, e.g., a classifier for natural language recognition. However, in some embodiments, the data may be a table. In such a case, the parse engine 211 may simply extract features into, e.g., a feature vector directly from the data. However, in some embodiments, the data may include a combination of character strings, as well as structured data, such as tables, tuples, lists, arrays, among other. Thus, in some embodiments, the parse engine 211 may include model or algorithm for parsing the character strings and then extracting feature vectors from the structured data and the parsed character strings. In some embodiments, as a result of the parsing and feature extraction, the parse engine 211 may produce meeting history features 285, personnel features 286 and predicted meeting room features 287 from each of the meeting history data 275, the personnel data 276 and the predicted meeting room parameters 255, respectively.

In some embodiments, the feature extraction algorithm may include, e.g., independent component analysis, an isomap, kernel principle component analysis (PCA), latent semantic analysis, partial least squares, principal component analysis, multifactor dimensionality reduction, nonlinear dimensionality reduction, multilinear PCA, multilinear subspace learning, semidefinite embedding, autoencoding, among others and combinations thereof. As a result, the parse engine 211 may generate feature vectors having, e.g., the meeting history features 285, the personnel features 286 and the predicted meeting room features 287 such that predictive features of scheduling information and location information can be provided to the calendar machine learning engine 212. In some embodiments, the feature vectors are aggregated into a feature map prior to modeling in the calendar machine learning engine 212.

In some embodiments, the calendar machine learning engine 212 receives the meeting history features 285, the personnel features 286 and the predicted meeting room features 287 to model meeting time each meeting and predict an optimum scheduled meeting for the attendees at the candidate meeting room. In some embodiments, the calendar machine learning engine 212 includes scheduling models 215 to predict the time of a meeting that is most likely to be accepted by all attendees.

In some embodiments, the scheduling models 215 may include, e.g., a machine learning model for predicting meeting time for the meeting to be scheduled. In some embodiments, the scheduling models 215 may first determined a predicted transit time of each attendee travelling to the meeting, including, e.g., traffic delays, travel times, check-in times, among other factors affecting transit time. In some embodiments, the meeting time model may predict a meeting time parameter 251 that represents an optimum meeting time for each attendee according to the predicted meeting room parameters 255 and associated candidate meeting room. In some embodiments, the meeting time model may predict the meeting time parameter 251 based on the predicted meeting room parameters 255, scheduling information and personnel information, including, e.g., predicted meeting room features 287, the meeting history features 285 and the personnel features 286. In some embodiments, using, e.g., a classifier, such as those described above, the meeting time model may transform the predicted meeting room features 287, the meeting history features 285 and the personnel features 286 into a feature vector output that may be decoded into the meeting time parameter 251 representing the optimum meeting time for the meeting of the electronic meeting request 214 and for a meeting to travel to the meeting based on the scheduling information of the attendees and meeting rooms. As a result, each attendee may receive a different meeting time according to the meeting time parameter 251 that reflects each attendee's transit time.

In some embodiments, an event generator 216 of the calendar machine learning engine 212 may receive the meeting time parameter 251 and the meeting room parameter 255 to generate a candidate meeting 253 for each attendee of the electronic meeting request 214. The candidate meeting 253 represents a meeting request for a corresponding meeting to be scheduled associated with the electronic meeting request 214, including a time and location for the meeting that is least likely to be rejected, canceled or rescheduled. In some embodiments, the event generator 216 may dynamically secure the candidate meeting 253 by automatically book the candidate meeting room at the specified time. In some embodiments, the candidate meeting 253 is first provided to each attendee at a user computing device 260. Each attendee may then accept, decline or request an alternative time or location according to a user selection 254. In some embodiments, the user selection 254 may cause the dynamic securing of the meeting time at the meeting location according to the candidate meeting 253.

In some embodiments, the user selection 254 may be provided to an optimizer 213 of the calendaring model 213. In some embodiments, the optimizer 213 may compare the user selection 254 to the corresponding predicted meeting time parameter 251 and meeting room parameter 255. Based on a difference between the user selection 254 to the corresponding predicted meeting time parameter 251 and meeting room parameter 255, the optimizer 213 may determine an error in the predictions by the calendar machine learning engine 212. In some embodiments, the optimizer 213 backpropagates the error to the calendar machine learning engine 212 to train the scheduling models 215 in an on-line fashion such that each prediction may be used as a training pair with the corresponding user selection. Thus, the scheduling models 215 may be updated as users provide user selections 254 to continually improve the scheduling models 215. In some embodiments, the optimizer 213 may employ optimization models including, but not limited to, e.g., gradient descent, regularization, stochastic gradient descent, Nesterov accelerated gradient, Adagrad, AdaDelta, adaptive momentum estimation (AdaM), root-mean-square propagation (RMS Prop), among others and combinations thereof.

In some embodiments, the user selection 232 may be a second selection after an initial selection. For example, where a user initially accepts the candidate meeting 253 via the user selection 254, the user may later cancel the meeting by a second user selection 254. The second user selection may be provided to the optimizer 213 in a similar fashion to the initial user selection 254 to determine an error and train the calendar machine learning engine 212. Moreover, the user selection 254 and the candidate meeting 253 may be provided to the meeting history of each attendee in the calendar database 201 to update the calendar database 201 with current information.

Similarly, in some embodiments, the user selection 254 or the corresponding candidate meeting 253 may be provided to each of the location database 203 and the meeting room database 204 to update information related to the location of attendees and availability of meeting rooms at the time of the candidate meeting 253. In some embodiments, the collaboration databases 270 are only updated upon the user selection 254.

Figure 5:
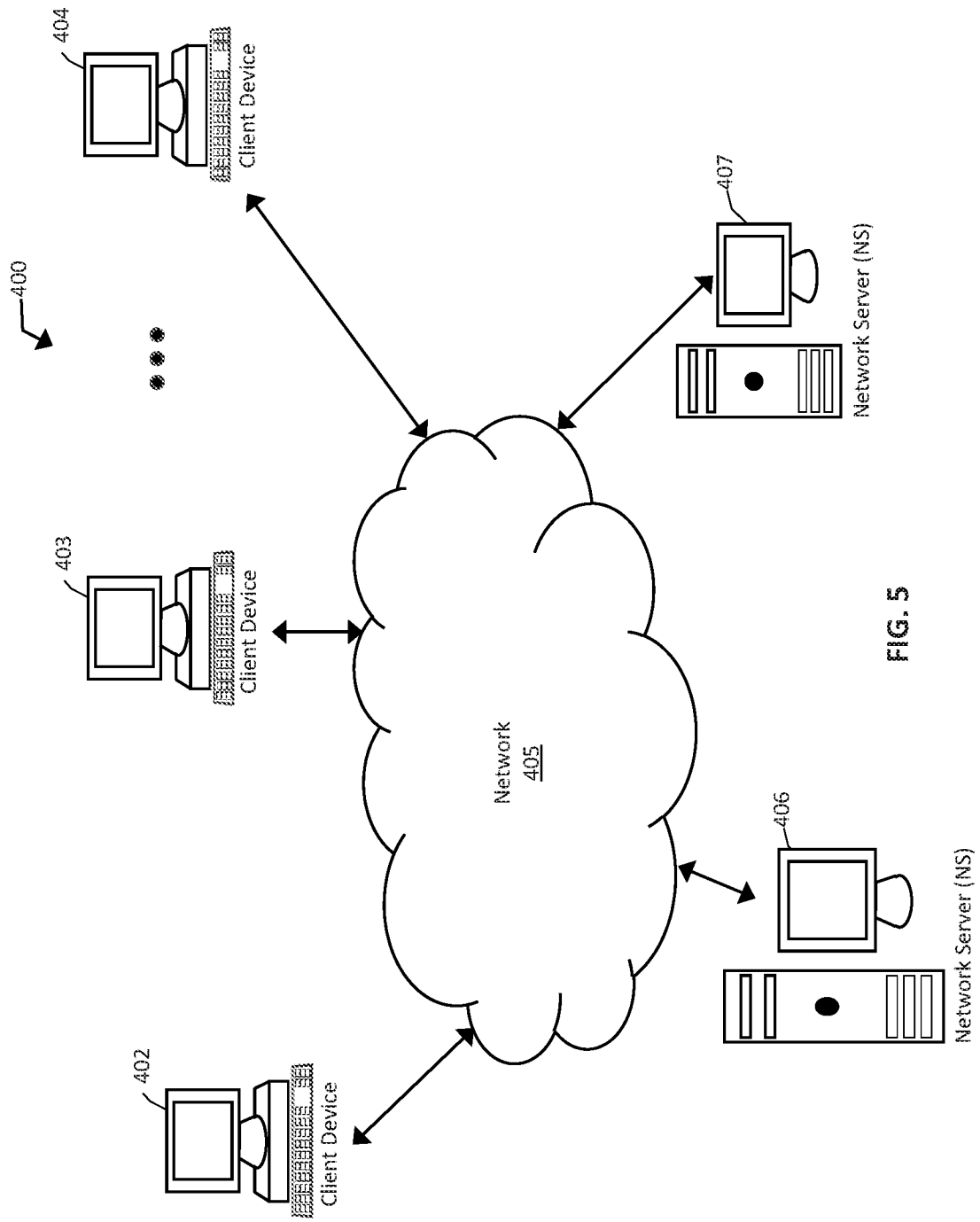

FIG. 5 depicts a block diagram of an exemplary computer-based system 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and the exemplary inventive computing components of the exemplary computer-based system 400 may be configured to manage a large number of members or concurrent transactions, as detailed herein. In some embodiments, the exemplary computer-based system 400 may be based on a scalable computer and network architecture that incorporates varies strategies for assessing the data, caching, searching, and database connection pooling. An example of the scalable architecture is an architecture that is capable of operating multiple servers.

In some embodiments, referring to FIG. 5, members 402-404 (e.g., clients) of the exemplary computer-based system 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and any other device that is equipped to communicate over a wired or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and video, and games.

In some embodiments, the exemplary network 405 may provide network access, data transport and other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for or provide cloud or network computing or combinations thereof. Although not shown in FIG. 5, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial and banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
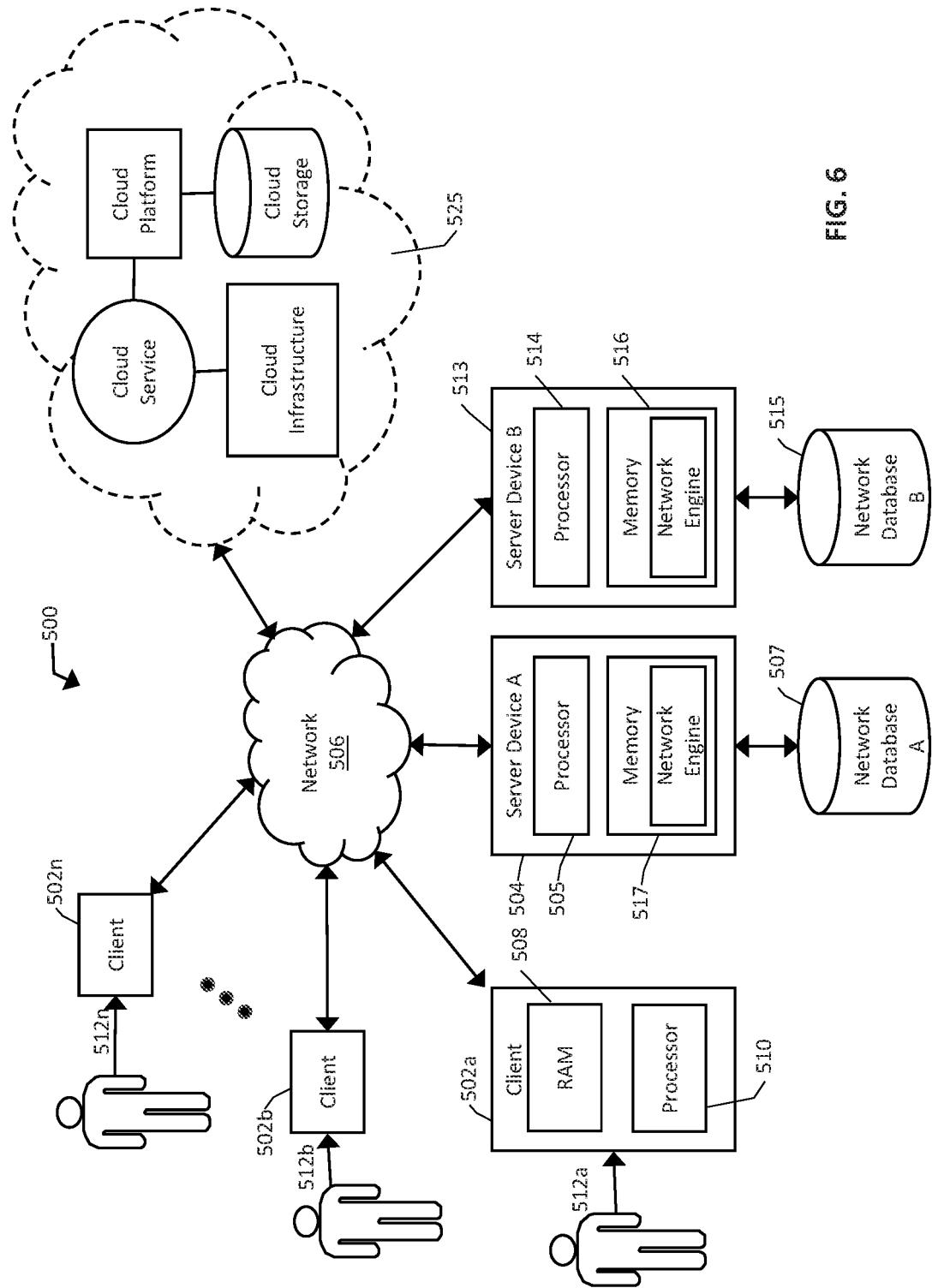

FIG. 6 depicts a block diagram of another exemplary computer-based system 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a though 502n may be specifically programmed with one or more application programs in accordance with one or more principles and methodologies detailed herein. In some embodiments, member computing devices 502a through 502n may operate on any operating system capable of supporting a browser or browser-enabled application, such as Microsoft™, Windows™, and Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and Opera. In some embodiments, through the member computing client devices 502a through 502n, users, 512a through 512n, may communicate over the exemplary network 506 with each other and with other systems and devices coupled to the network 506. As shown in FIG. 6, exemplary server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and retrieval of data in the respective database. In some embodiments, the exemplary DBMS-managed database may be specifically programmed to provide the ability to query, backup and replicate, enforce rules, provide security, compute, perform change and access logging, or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and objects. In some embodiments, the exemplary DBMS-managed database may be specifically programmed to include metadata about the data that is stored.

Figure 7:
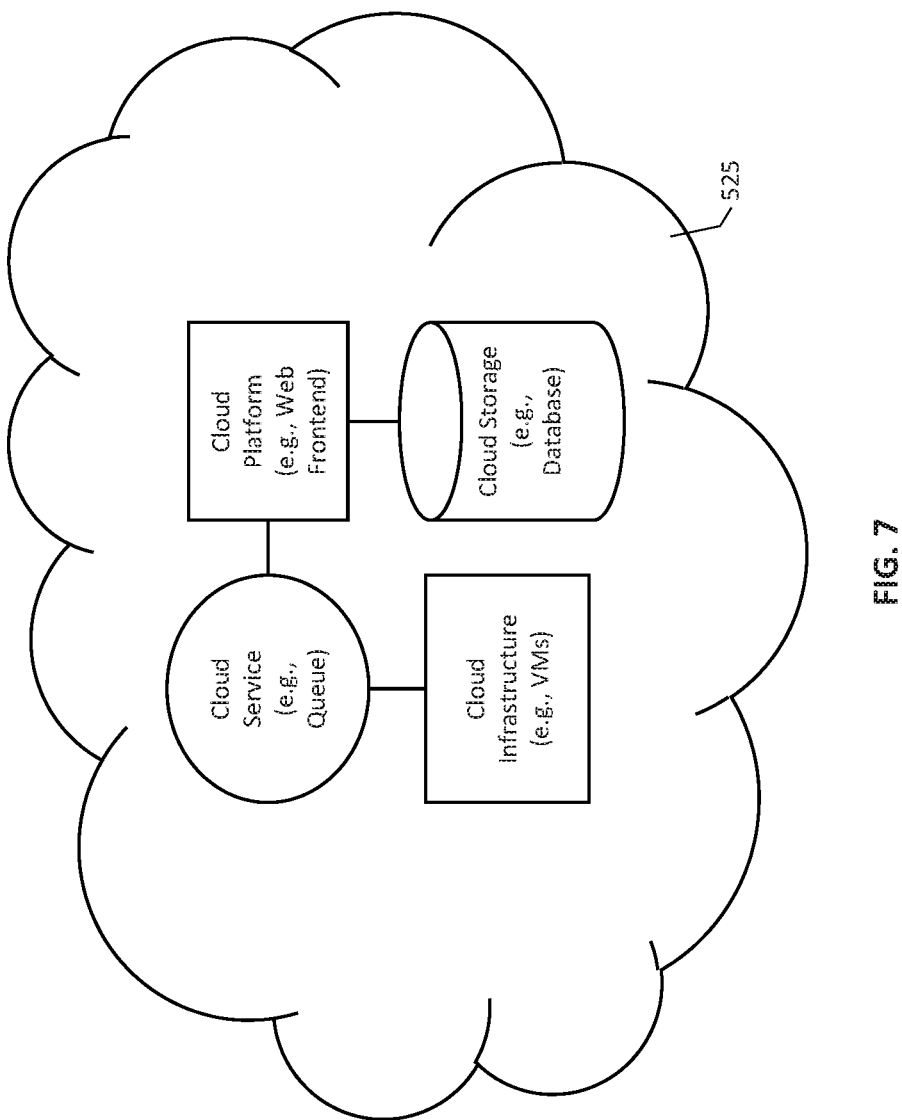

In some embodiments, the illustrative inventive computer-based systems of the present disclosure may be specifically configured to operate in a cloud computing or architecture such as, but not limiting to: infrastructure a service (IaaS), platform as a service (PaaS), and software as a service (SaaS). FIGS. 7 and 8 illustrate schematics of exemplary implementations of the cloud computing or architecture(s) in which the illustrative computer-based systems of the present disclosure may be specifically configured to operate.

At least some aspects of the present disclosure will now be described with reference to the following numbered clauses.

1. A method comprising:
receiving, by at least one processor, a plurality of electronic meeting requests to schedule a meeting;
  wherein each electronic meeting request comprises an attendee data identifying at least one respective attendee of each respective meeting;

utilizing, by the at least one processor, a meeting room locator machine learning model to predict a plurality of meeting room parameters of at least one meeting room object representing the at least one candidate meeting room based at least in part on a plurality of meeting room needs data and location information associated with the respective electronic meeting request;
   wherein the plurality of meeting room needs data comprise:
      i) at least one meeting resource data identifying at least one meeting room resource that the at least one respective attendee would require at least one candidate meeting room to have, and
      ii) a meeting room size data identifying a meeting room size of the at least one candidate meeting room;
   wherein the plurality of meeting room parameters of at least one meeting room object comprises:
      i) a meeting location parameter, and
      ii) a meeting room resource parameter;
   wherein the location information comprises:
      i) an attendee location data identifying at least one respective location associated with the at least one respective attendee,
      ii) available meeting room data identifying all available meeting rooms, and
      iii) a meeting room location associated with each available meeting room;
utilizing, by the at least one processor, a meeting scheduling machine learning model to predict a plurality of meeting parameters of at least one calendar object representing at least one candidate meeting time based at least in part on the at least one candidate meeting room, schedule information associated with the respective electronic meeting request and the location information associated with the respective electronic meeting request;
   wherein the plurality of parameters of at least one calendar object comprises a meeting time parameter;
   wherein the schedule information comprises:
      i) an availability data identifying availability of each of the at least one respective attendee based on respective calendar data obtained from each respective electronic calendar associated with the respective at least one attendee,
      ii) a meeting history data identifying meeting history of the at least one respective attendee based on the respective calendar data obtained from each respective electronic calendar associated with the respective at least one attendee,
      wherein the meeting history data comprises:
         1) cancellation data identifying meeting cancellations, and
         2) rescheduling data identifying meeting rescheduling occurrences;
causing to display, by the at least one processor, an indication of the at least one candidate meeting room and the at least one candidate meeting time in response to the at least one electronic meeting request on a screen of at least one computing device associated with the at least one respective attendee based at least in part on the plurality of predicted meeting room parameters of the at least one respective meeting room object representing the at least one respective candidate meeting room and the plurality of predicted meeting parameters of at least one respective calendar object representing at least one respective candidate meeting time;
receiving, by the at least one processor, a selection of the at least one respective candidate meeting room and the at least one respective candidate meeting time from the at least one respective attendee; and
dynamically securing, by the at least one processor, the at least one respective candidate meeting room at the at least one respective candidate meeting time.

2. The method of clause 1, wherein the attendee location data associated with the at least one respective attendee comprises a real-time location based on tracking an employee badge.

3. The method of clause 1, wherein the attendee location data associated with the at least one respective attendee comprises a real-time location based on global positioning (GPS) data associated with an attendee mobile device.

4. The method of clause 1, further comprising determining, by the at least one processor, traffic data identifying a traffic delay for a transit time associated a transit from each respective attendee location to each meeting room location associated with each available candidate meeting rooms.

5. The method of clause 1, further comprising determining, by the at least one processor, a cancellation prediction using the meeting scheduling machine learning model based at least in part on the cancellation data associate with each of the at least one respective attendee.

6. The method of clause 1, wherein the meeting room locator machine learning model is further utilized to predict an attendee prioritization parameter to prioritize the location information associated with each of the at least one attendee according to each respective hierarchical position associated with each respective at least one attendee;
   wherein the attendee prioritization parameter comprises the location information associated with the at least one respective attendee;
   wherein the hierarchical position of each of the at least one attendee is based on an organization chart.

7. The method of clause 1, further comprising training, by the at least one processor, the meeting room locator machine learning model based on a meeting result;

8. The method of clause 7, wherein the meeting result comprises meeting disposition data identifying a completed meeting at the meeting location.

9. The method of clause 7, wherein the meeting disposition data comprises one of selection comprising a cancellation indication and a reschedule indication;
   wherein the cancellation indication identifies a cancelling of the meeting location; and
   wherein the reschedule indication identifies a rescheduling of the meeting location.

10. A method comprising:
receiving, by the at least one processor, at least one electronic relocation request associated with a scheduled meeting;
   wherein each electronic relocation request comprises:
      i) an attendee data identifying at least one respective attendee of each respective meeting, and
      ii) a new meeting location;
determining, by the at least one processor, an error associated with a plurality of predicted meeting room parameters of at least one meeting room object representing at least one candidate meeting room predicted by a meeting room locator machine learning model;
   wherein the error associated with the plurality of predicted meeting room parameters is based at least in part on the at least one electronic relocation request and each respective plurality of predicted meeting room parameters;

wherein the plurality of predicted meeting room parameters of at least one meeting room object comprises:
i) a meeting location parameter, and
ii) a meeting room resource parameter;
wherein the location information comprises:
i) an attendee location data identifying at least one respective location associated with the at least one respective attendee,
ii) available meeting room data identifying all available meeting rooms, and
iii) a meeting room location associated with each available meeting room;
training, by the at least one processor, the meeting room locator machine learning model based at least in part on the error associated with the plurality of predicted meeting room parameters;
utilizing, by the at least one processor, a meeting room locator machine learning model to predict a plurality of meeting room parameters of at least one meeting room object representing the at least one candidate meeting room based at least in part on a plurality of meeting room needs and location information associated with the respective electronic meeting request;
wherein the plurality of meeting room needs comprise:
i) at least one meeting resource data identifying at least one meeting room resource that the at least one respective attendee would require at least one candidate meeting room to have, and
ii) a meeting room size data identifying a meeting room size of the at least one candidate meeting room;
causing to display, by the at least one processor, an indication of the at least one candidate meeting room in response to the at least one electronic relocation request on a screen of at least one computing device associated with the at least one respective attendee based at least in part on the plurality of predicted meeting room parameters of the at least one respective meeting room object representing the at least one respective candidate meeting room;
receiving, by the at least one processor, a selection of the at least one respective candidate meeting room from the at least one respective attendee; and
dynamically securing, by the at least one processor, the at least one respective candidate meeting room at the at least one respective candidate meeting time.

11. The method of clause 10, wherein the attendee location data associated with the at least one respective attendee comprises a real-time location based on tracking an employee badge.

12. The method of clause 10, wherein the attendee location data associated with the at least one respective attendee comprises a real-time location based on global positioning (GPS) data associated with an attendee mobile device.

13. The method of clause 10, further comprising determining, by the at least one processor, traffic data identifying a traffic delay for a transit time associated a transit from each respective attendee location to each meeting room location associated with each available candidate meeting rooms.

14. The method of clause 10, further comprising determining, by the at least one processor, a cancellation prediction using the meeting scheduling machine learning model based at least in part on the cancellation data associate with each of the at least one respective attendee.

15. The method of clause 10, wherein the meeting room locator machine learning model is further utilized to predict an attendee prioritization parameter to prioritize the location information associated with each of the at least one attendee according to each respective hierarchical position associated with each respective at least one attendee;
wherein the attendee prioritization parameter comprises the location information associated with the at least one respective attendee;
wherein the hierarchical position of each of the at least one attendee is based on an organization chart.

16. The method of clause 10, further comprising training, by the at least one processor, the meeting room locator machine learning model based on a meeting result;

17. The method of clause 16, wherein the meeting result comprises meeting disposition data identifying a completed meeting at the meeting location.

The method of clause 16, wherein the meeting disposition data comprises one of selection comprising a cancellation indication and a reschedule indication;
wherein the cancellation indication identifies a cancelling of the meeting location; and
wherein the reschedule indication identifies a rescheduling of the meeting location.

18. A system comprising:
a calendar database configured to store calendar data associated with each employee of an organization;
a meeting room database configured to store meeting room characteristics of possible meeting rooms of the organization; and
at least one processor in communication with the calendar database and the meeting room database;
wherein the at least one processor is configured to:
receive a plurality of electronic meeting requests to schedule a meeting;
wherein each electronic meeting request comprises an attendee data identifying at least one respective attendee of each respective meeting;
utilize a meeting room locator machine learning model to predict plurality of meeting room parameters of at least one meeting room object representing the at least one candidate meeting room based at least in part on a plurality of meeting room needs and location information associated with the respective electronic meeting request;
wherein the plurality of meeting room needs comprise:
i) at least one meeting resource data identifying at least one meeting room resource that the at least one respective attendee would require at least one candidate meeting room to have, and
ii) a meeting room size data identifying a meeting room size of the at least one candidate meeting room;
wherein the plurality of parameters of at least one meeting room object comprises:
i) a meeting location parameter, and
ii) a meeting room resource parameter;
wherein the location information comprises:
i) an attendee location data identifying at least one respective location associated with the at least one respective attendee,
ii) available meeting room data identifying all available meeting rooms, and
iii) a meeting room location associated with each available meeting room;
utilize a meeting scheduling machine learning model to predict a plurality of meeting parameters of at least one calendar object representing at least one candidate meeting time based at least in part on the at least one candidate meeting room, schedule information associated with the respective electronic meeting request and the location information associated with the respective electronic meeting request;
wherein the plurality of parameters of at least one calendar object comprises a meeting time parameter;
wherein the schedule information comprises:
i) an availability data identifying availability of each of the at least one respective attendee based on respective calendar data obtained from each respective electronic calendar associated with the respective at least one attendee,
ii) a meeting history data identifying meeting history of the at least one respective attendee based on the respective calendar data obtained from each respective electronic calendar associated with the respective at least one attendee, wherein the meeting history data comprises:
1) cancellation data identifying meeting cancellations, and
2) rescheduling data identifying meeting rescheduling occurrences;
cause to display an indication of the at least one candidate meeting room and the at least one candidate meeting time in response to the at least one electronic meeting request on a screen of at least one computing device associated with the at least one respective attendee based at least in part on the plurality of predicted plurality of meeting room parameters of the at least one respective meeting room object representing the at least one respective candidate meeting room and the plurality of predicted meeting parameters of at least one respective calendar object representing at least one respective candidate meeting time;
receive a selection of the at least one respective candidate meeting room and the at least one respective candidate meeting time from the at least one respective attendee; and
dynamically secure the at least one respective candidate meeting room at the at least one respective candidate meeting time.
19. The system of clause 18, wherein the at least one processor is further configured to utilize the meeting room locator machine learning model to determine a traffic delay for a transit time of each of the at least one attendee to each of the available meeting rooms.
20. The system of clause 18, wherein the at least one processor is further configured to train the meeting room locator machine learning model based on a meeting modification comprising a change by one or more of the at least one attendee to the meeting location.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems described herein can be utilized in any combination with each other. Further still, the various steps may be carried out in any desired order (and any desired steps may be added or any desired steps may be eliminated).

The invention claimed is:
1. A method comprising:
receiving, by at least one processor, an electronic meeting request to schedule a meeting;
wherein the electronic meeting request comprises an attendee data identifying at least one attendee of the meeting;
wherein the electronic meeting request comprises at least one meeting description;
determining, by the at least one processor, a plurality of meeting room needs data indicative of a plurality of meeting room needs for the electronic meeting request based at least in part on the attendee data and the at least one meeting description of the electronic meeting request;
wherein the plurality of meeting room needs data comprises:
i) at least one meeting resource data identifying at least one meeting room resource required for the meeting, and
ii) a meeting room size data identifying a meeting room size for the meeting;
utilizing, by the at least one processor, a meeting room locator machine learning model to predict a plurality of meeting room parameters of a plurality of meeting room objects representing a plurality of candidate meeting rooms based at least in part on the plurality of meeting room needs data and location information associated with the electronic meeting request;
wherein the plurality of meeting room parameters of the plurality of meeting room objects comprises a meeting location parameter of each meeting room object;
wherein the location information comprises:
i) an attendee location data identifying at least one location associated with the at least one attendee,
ii) meeting room data identifying all meeting rooms, and
iii) a meeting room location associated with each meeting room;
utilizing, by the at least one processor, a meeting scheduling machine learning model to predict a plurality of meeting parameters of at least one calendar object representing at least one candidate meeting time based at least in part on the plurality of candidate meeting rooms, schedule information associated with the electronic meeting request and the location information associated with the electronic meeting request;
wherein the plurality of meeting parameters of the at least one calendar object comprises:
i) a meeting time parameter representing a particular time for the meeting and
ii) a meeting room parameter representing a particular candidate meeting room of the plurality of candidate meeting rooms;
wherein the schedule information comprises:
i) an availability data identifying availability of each of the at least one attendee based on calendar data obtained from at least one electronic calendar associated with the at least one attendee,
ii) a meeting room availability data identifying availability of each candidate meeting room of the plurality of candidate meeting rooms; and
dynamically securing, by the at least one processor in real-time, a meeting period within the at least one electronic calendar object of the at least one electronic calendar associated with the at least one attendee so as to reserve the particular candidate meeting room for the particular time for the meeting.

2. The method of claim 1, wherein the attendee location data associated with the at least one attendee comprises a real-time location based on tracking an employee badge.

3. The method of claim 1, wherein the attendee location data associated with the at least one attendee comprises a real-time location based on global positioning (GPS) data associated with an attendee mobile device.

4. The method of claim 1, further comprising determining, by the at least one processor, traffic data identifying a traffic delay for a transit time associated a transit from each attendee location to each meeting room location associated with each available candidate meeting room.

5. The method of claim 1, further comprising determining, by the at least one processor, a cancellation prediction using the meeting scheduling machine learning model based at least in part on cancellation data associated with each of the at least one attendee.

6. The method of claim 1, wherein the meeting room locator machine learning model is further utilized to predict an attendee prioritization parameter to prioritize the location information associated with the at least one attendee according to at least one hierarchical position associated with the at least one attendee;
wherein the attendee prioritization parameter comprises the location information associated with the at least one attendee;
wherein the hierarchical position of each of the at least one attendee is based on an organization chart.

7. The method of claim 1, further comprising training, by the at least one processor, the meeting room locator machine learning model based on a meeting result.

8. The method of claim 7, wherein the meeting result comprises meeting disposition data identifying a completed meeting at the meeting location.

9. The method of claim 8, wherein the meeting disposition data comprises at least one of a cancellation indication or a reschedule indication;
wherein the cancellation indication identifies a cancelling of the meeting location; and
wherein the reschedule indication identifies a rescheduling of the meeting location.

10. A method comprising:
receiving, by at least one processor, at least one electronic relocation request associated with a scheduled meeting;
wherein the at least one electronic relocation request comprises:
i) an attendee data identifying at least one attendee of the scheduled meeting, and
ii) a new meeting location;
wherein the at least one electronic meeting request comprises at least one meeting description;
determining, by the at least one processor, a plurality of meeting room needs data indicative of a plurality of meeting room needs for the at least one electronic relocation request based at least in part on the attendee data and the at least one meeting description;
wherein the plurality of meeting room needs data comprise:
i) at least one meeting resource data identifying at least one meeting room resource required for the scheduled meeting, and
ii) a meeting room size data identifying a meeting room size for the scheduled meeting;
creating, by the at least one processor, a first training pair comprising the at least one electronic relocation request and a plurality of predicted meeting room parameters of at least one meeting room object representing a particular candidate meeting room predicted by a meeting room locator machine learning model;
determining, by the at least one processor, an error associated with the plurality of predicted meeting room parameters of the at least one meeting room object and location information associated with the at least one electronic relocation request;
wherein the error associated with the plurality of predicted meeting room parameters is based at least in part on the at least one electronic relocation request and the plurality of predicted meeting room parameters;
wherein the plurality of predicted meeting room parameters of at least one meeting room object comprises a meeting location parameter;
wherein the location information comprises:
i) an attendee location data identifying at least one location associated with the at least one attendee,
ii) meeting room data identifying all meeting rooms, and
iii) a meeting room location associated with each meeting room;
training, by the at least one processor, the meeting room locator machine learning model based at least in part on the error associated with the plurality of predicted meeting room parameters;
utilizing, by the at least one processor, the meeting room locator machine learning model to predict a plurality of meeting room parameters of a plurality of meeting room objects representing a plurality of candidate meeting rooms based at least in part on the plurality of meeting room needs and location information associated with the at least one electronic relocation request;
utilizing, by the at least one processor, a meeting scheduling machine learning model to predict a plurality of meeting parameters of at least one calendar object representing at least one candidate meeting time based at least in part on the plurality of candidate meeting rooms, schedule information associated with the at least one electronic relocation request and the location information associated with the at least one electronic relocation request;
wherein the plurality of meeting parameters of the at least one calendar object comprises:
i) a meeting time parameter representing a particular time for the meeting and
ii) a meeting room parameter representing a particular candidate meeting room of the plurality of candidate meeting rooms;
wherein the schedule information comprises:
i) an availability data identifying availability of each of the at least one attendee based on calendar data obtained from at least one electronic calendar associated with the at least one attendee,
ii) a meeting room availability data identifying availability of each candidate meeting room of the plurality of candidate meeting rooms; and
dynamically securing, by the at least one processor, the particular candidate meeting room.

11. The method of claim 10, wherein the attendee location data associated with the at least one attendee comprises a real-time location based on tracking an employee badge.

12. The method of claim 10, wherein the attendee location data associated with the at least one attendee comprises a real-time location based on global positioning (GPS) data associated with an attendee mobile device.

13. The method of claim 10, further comprising determining, by the at least one processor, traffic data identifying a traffic delay for a transit time associated a transit from each attendee location to each meeting room location associated with each available candidate meeting room.

14. The method of claim 10, further comprising determining, by the at least one processor, a cancellation prediction using the meeting scheduling machine learning model based at least in part on the at least one electronic relocation request associated with the at least one attendee.

15. The method of claim 10, wherein the meeting room locator machine learning model is further utilized to predict an attendee prioritization parameter to prioritize the location information associated with the at least one attendee according to at least one hierarchical position associated with the at least one attendee;
wherein the attendee prioritization parameter comprises the location information associated with the at least one attendee;
wherein the hierarchical position of the at least one attendee is based on an organization chart.

16. The method of claim 10, further comprising training, by the at least one processor, the meeting room locator machine learning model based on a meeting result.

17. The method of claim 16, wherein the meeting result comprises meeting disposition data identifying a completed meeting at the meeting location.

18. A system comprising:
a calendar database configured to store calendar data associated with each employee of an organization;
a meeting room database configured to store meeting room characteristics of possible meeting rooms of the organization; and
at least one processor in communication with the calendar database and the meeting room database;
wherein the at least one processor is configured to:
receive an electronic meeting request to schedule a meeting;
wherein the electronic meeting request comprises an attendee data identifying at least one attendee of the meeting;
wherein the electronic meeting request comprises at least one meeting description;
determine a plurality of meeting room needs data indicative of a plurality of meeting room needs for the electronic meeting request based at least in part on the attendee data and the at least one meeting description of the electronic meeting request;
wherein the plurality of meeting room needs data comprises:
i) at least one meeting resource data identifying at least one meeting room resource required for the meeting, and
ii) a meeting room size data identifying a meeting room size for the meeting;
utilize a meeting room locator machine learning model to predict a plurality of meeting room parameters of a plurality of meeting room objects representing a plurality of candidate meeting rooms based at least in part on the plurality of meeting room needs data and location information associated with the electronic meeting request;
wherein the plurality of meeting room parameters of the plurality of meeting room objects comprises a meeting location parameter of each meeting room object;
wherein the location information comprises:
i) an attendee location data identifying at least one location associated with the at least one attendee,
ii) meeting room data identifying all meeting rooms, and
iii) a meeting room location associated with each meeting room;
utilize a meeting scheduling machine learning model to predict a plurality of meeting parameters of at least one calendar object representing at least one candidate meeting time based at least in part on the plurality of candidate meeting rooms, schedule information associated with the electronic meeting request and the location information associated with the electronic meeting request;
wherein the plurality of meeting parameters of the at least one calendar object comprises:
i) a meeting time parameter representing a particular time for the meeting and
ii) a meeting room parameter representing a particular candidate meeting room of the plurality of candidate meeting rooms;
wherein the schedule information comprises:
i) an availability data identifying availability of each of the at least one attendee based on calendar data obtained from at least one electronic calendar associated with the at least one attendee,
ii) a meeting room availability data identifying availability of each candidate meeting room of the plurality of candidate meeting rooms; and
dynamically secure, in real-time, a meeting period within the at least one electronic calendar object of the at least one electronic calendar associated with the at least one attendee so as to reserve the particular candidate meeting room for the particular time for the meeting.

19. The system of claim 18, wherein the at least one processor is further configured to utilize the meeting room locator machine learning model to determine a traffic delay for a transit time of the at least one attendee to each of the available meeting rooms.

20. The system of claim 18, wherein the at least one processor is further configured to train the meeting room locator machine learning model based on a meeting modification comprising a change by the at least one attendee to the meeting location.

* * * * *